US008167209B2

(12) United States Patent
Joseph et al.

(10) Patent No.: US 8,167,209 B2
(45) Date of Patent: May 1, 2012

(54) INCREASING IMAGING QUALITY OF A BAR CODE READER

(75) Inventors: Eugene Joseph, Coram, NY (US); Duanfeng He, South Setauket, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 256 days.

(21) Appl. No.: 12/624,071

(22) Filed: Nov. 23, 2009

(65) Prior Publication Data

US 2011/0121077 A1    May 26, 2011

(51) Int. Cl.
*G06K 7/10*    (2006.01)
(52) U.S. Cl. .......... 235/462.11; 235/462.24; 235/462.41
(58) Field of Classification Search ............. 235/462.11, 235/462.1, 462.24, 462.41
See application file for complete search history.

(56) References Cited

U.S. PATENT DOCUMENTS

| | | | |
|---|---|---|---|
| 6,572,019 B1 * | 6/2003 | Rando et al. | 235/472.01 |
| 6,976,632 B2 * | 12/2005 | Blake et al. | 235/472.01 |
| 2005/0017078 A1 * | 1/2005 | Bhatia et al. | 235/462.45 |
| 2006/0163356 A1 * | 7/2006 | Shigekusa | 235/454 |
| 2010/0155487 A1 * | 6/2010 | Liu et al. | 235/462.42 |

* cited by examiner

*Primary Examiner* — Edwyn Labaze
(74) *Attorney, Agent, or Firm* — Nong-Qiang Fan

(57) ABSTRACT

The exemplary system requires a 2D barcode be located on an object, a portion of which is to be captured in an image. The module size of the 2D barcode is chosen to match the smallest feature to be preserved on the output image. While the target is moving with respect to the imager the 2D bar code is also moving and the resulting image is degraded. The imager will properly decode the 2D barcode only if the bar code is stationary (or moving very slowly) and hence will provide an acceptable image in the region of the 2D bar code.

9 Claims, 5 Drawing Sheets

INCREASING IMAGING QUALITY OF A BAR CODE READER

TECHNICAL FIELD

The present disclosure relates to a system comprising a method and apparatus for increasing the imaging quality in an imaging bar code reader.

BACKGROUND

Existing portable barcode readers are hand held and can be moved with respect to a target barcode, to image and decode the bar code. Target objects, e.g., a product package that includes a target barcode, are brought within a field-of-view ("FOV") of the barcode reader by aiming a visible aiming pattern to strike the package at a region of the barcode. In stationary bar code readers the situation is reversed, i.e. the product is moved through a stationary field of view. The barcode reader typically provides an audible and/or visual signal to indicate the target barcode has been successfully imaged and decoded.

Both stationary and portable imaging-based barcode readers include at least one camera or scan engine. A typical scan engine has a pixel array having photosensitive elements such as a charge coupled device (CCD) or complementary metal oxide semiconductor (CMOS) device. The scan engine also typically includes an illumination system having light emitting diodes (LEDs) or a cold cathode fluorescent lamp (CCFL) that directs illumination toward a target object, e.g., a target bar code. Light reflected from the target bar code is focused through a lens located near or on the scan engine by an imaging system such that focused light is concentrated onto the pixel array of photosensitive elements. The pixels of the array are sequentially read out by the scan engine, generating an analog signal representative of a captured image frame. The analog signal is amplified by a gain factor and the amplified analog signal is digitized by an analog-to-digital converter. Decoding circuitry of the imaging system processes the digitized signals and decodes the imaged bar code.

Users of imaging based bar code readers can capture images that include signatures or parts of a form in the region of a bar code. To reduce the size of the output picture from the reader, only the desired part of the form need be captured. In some applications, the desired part of the form is defined relative to a barcode printed on the form.

If the user is moving the bar code reader with respect to the product or the user moves the product with respect to a stationary reader when the image is captured, the image may be blurred even through the bar code is accurately decoded.

SUMMARY

An exemplary system improves the quality of images captured by an image based bar code reader. The bar code reader acquires an image within a bar code reader field of view and a controller then confirms suitability of the captured image.

The system images a document or object having indicia specifically located on the document or object that include generally orthogonally extending edges within a bar code reader field of view. Suitability of the image is confirmed by evaluating the indicia contained within the image and once the suitability of the captured image is confirmed, the system stores some or all of the captured image in a memory.

The exemplary system uses a 2D barcode located on the object. A unit module size of the 2D barcode is chosen to match the smallest feature to be preserved on the output image. On a 2D bar code this unit module size is the smallest dimension of a rectangular unit that combine to make up the bar code. While the target is moving with respect to the imager the 2D bar code is also moving and the resulting image is degraded. The imager will properly decode the 2D barcode only if the bar code is stationary (or moving very slowly) and hence will provide an acceptable image in the region of the 2D bar code.

BRIEF DESCRIPTION OF THE DRAWINGS

The foregoing and other features and advantages of the present disclosure will become apparent to one skilled in the art to which the present disclosure relates upon consideration of the following description of the invention with reference to the accompanying drawings, wherein like reference numerals, unless otherwise described refer to like parts throughout the drawings and in which.

DETAILED DESCRIPTION

The present disclosure relates to a system for increasing the imaging quality in an imaging scanner. In particular, the system of the present disclosure comprises an apparatus and method for increasing the imaging quality of an imaging scanner by use of a 2D bar code.

Figure 1:
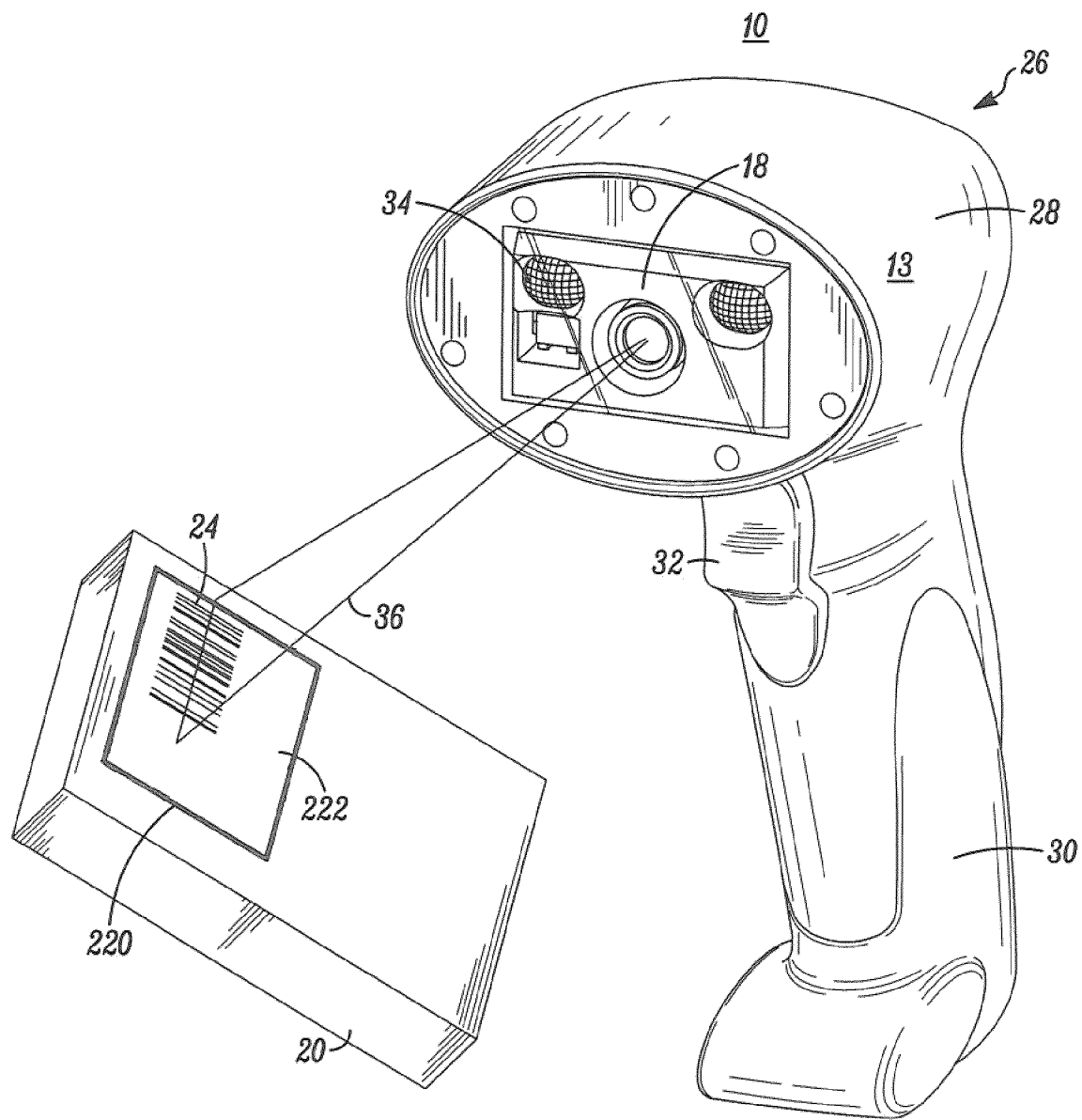
FIG. 1 is a perspective view of a portable scanner having at least one scan engine for imaging a target object.

In one example embodiment illustrated in FIG. 1, the imaging system 10 comprises a hand held portable scanner 26 that can be carried. One use of the imaging system 10 is by a user walking or riding through a store, warehouse, or plant, while reading various symbology codes for stocking and inventory control purposes. The portable scanner 26 of FIG. 1 includes a housing 13 having a head 28, handle 30, and trigger 32. Located in the housing is a protective window 34 for protecting an imaging subsystem or scan engine 18.

The scan engine 18 projects an aiming pattern 36 toward a target bar code 24 located on a product 20 or product's packaging during operation for decoding the image found in the target object. The operation of the decoding process by the scan engine 18 is further described in U.S. application Ser. No. 11/647,877 having a filing date of Dec. 29, 2006 entitled IMAGING-BASED READER HAVING LIGHT GUIDED ILLUMINATION, which is assigned to the assignee of the present application and incorporated herein by reference.

Figure 2:
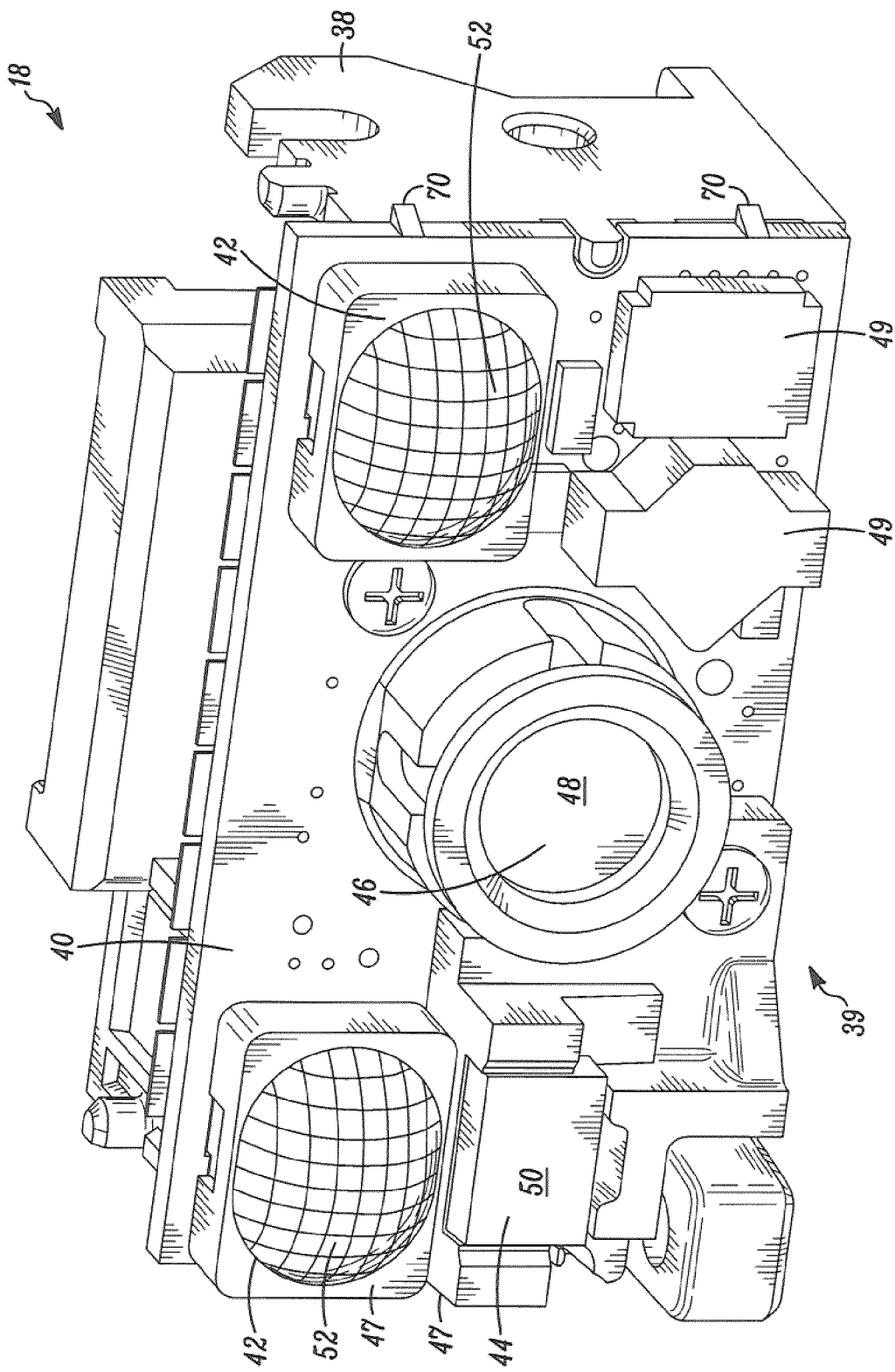
FIG. 2 is a perspective view of a single scan engine used in either a portable or stationary bar code.

Illustrated in FIG. 2 is perspective view of the scan engine 18. The scan engine 18 comprises a chassis 38 and a front face 39. Connected to the chassis 38 along the front face 39 is a printed circuit board 40. Attached to the printed circuit board 40 are several optical components that include, illumination optics 42, aiming optics 44 for generating the aiming pattern 36, and imaging optics 46. Each of the optical components have a designed field-of-view for projecting or receiving light directed during operation at the target object 24. The optical components above are further secured to the printed circuit board 40 by surface objects 47. Also coupled to the printed circuit board 40 are various electrical components 49 that assist the scan engine 18 in imaging and decoding the target object 24.

The imaging optics 46 includes focusing lens or lenses 48 that focus the reflected image from the target object 24 onto a sensor array (not shown) located behind the focusing lens(es) and in front of the printed circuit board 40. The aiming optics 44 include a refractive or diffractive optical element 50 that facilitates in the projection of an aiming pattern 36 for aligning the scan engine with the target object 24. The aiming pattern is generated by a laser diode (not shown) located behind the optical element 50 and coupled to the printed circuit board 40.

When enabled by a controller 100 (FIG. 3), the imaging optics 46 captures an image frame of a field of view FV of the imaging system. When imaging a target bar code 25, the imaging process may need to capture and store in a memory 134 a series of image frames 124 (FIG. 3) in response to multiple user actuations of the trigger. A decoding system 130 analyzes each image frame of the series of image frames 124 and attempts to decode the imaged bar code. All or portions of the images 132 are stored in a buffer memory 134 based on the results of this decoding.

Figure 3:
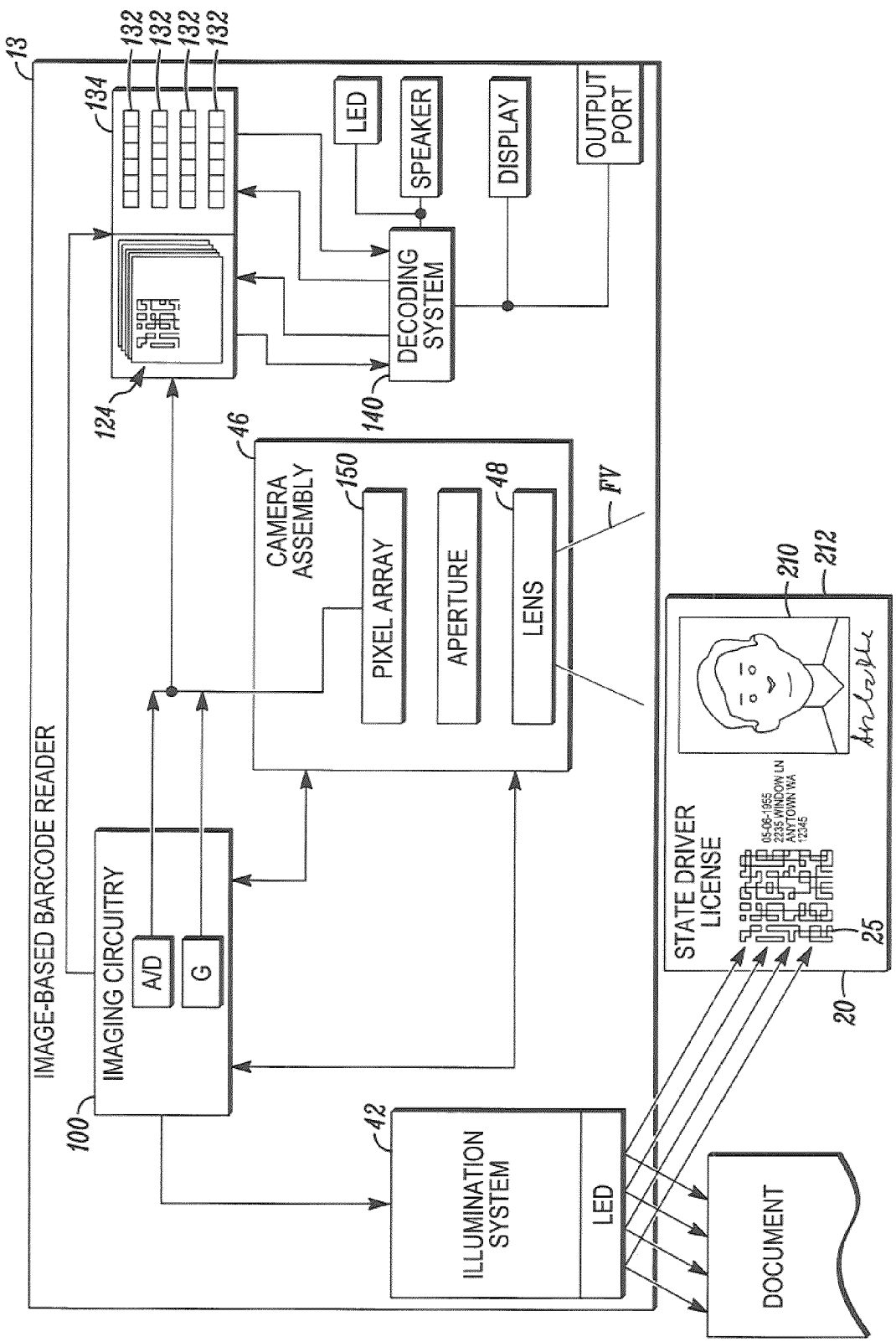
FIG. 3 is a block diagram of the scan engine shown in FIG. 2.

As depicted in FIG. 3, the imaging optics 46 is coupled to the controller 100. The imaging optics 46 includes a housing supporting focusing optics including a focusing lens 48 and a 2D photosensor or pixel array 150. The imaging optics 46 is enabled during an imaging session to capture images of the field of view FV of the focusing lens 48 and that make up the image frames 124.

The bar code reader circuitry within the housing 13 is electrically coupled to a power supply, which may be in the form of an on-board battery or a connected off-board power supply. If powered by an on-board battery, the reader 10 may be a stand-alone, portable unit as depicted in FIG. 1. If powered by an off-board power supply, the reader 10 may have some or all of the reader's functionality provided by a connected host device. Circuitry associated with the imaging and decoding systems may be embodied in hardware, software, firmware, electrical circuitry or any combination thereof and may be disposed within, partially within, or external to the reader housing 13.

The sensor array 150 may comprise a charged coupled device (CCD), a complementary metal oxide semiconductor (CMOS), or other imaging pixel array, operating under the control of the imaging circuitry 24. In one exemplary embodiment, the pixel array 150 comprises a two dimensional (2D) mega pixel array with a typical size of the pixel array being on the order of 1280×1024 pixels.

During an imaging session, multiple images of the field of view FV may be obtained by the imaging system 10. An imaging session may be instituted by an operator, for example, pressing the trigger 32 to institute an imaging. Alternately, for a stationary imaging system, an imaging session might start when a lower or bottom edge of an item begin to move through a portion of the field of view FV. After an exposure period, some or all of the pixels of pixel array 150 are successively read out by the controller 100, thereby generating an analog signal which is converted by an analog to digital converter that forms part of the controller 100. In some sensors, particularly CMOS sensors, all pixels of the pixel array 150 are not exposed at the same time, thus, reading out of some pixels may coincide in time with an exposure period for some other pixels.

The analog image signal represents a sequence of photosensor voltage values, the magnitude of each value representing an intensity of the reflected light received by a photosensor/pixel during an exposure period. The analog signal from the array 150 is amplified by a gain factor, generating an amplified analog signal. The amplified analog signal is digitized by an A/D converter generating a digitized signal. The digitized signal comprises a sequence of digital gray scale values typically ranging from 0-255 (for an eight bit processor, i.e., $2^8$=256), where a 0 gray scale value would represent an absence of any reflected light received by a pixel (characterized as low pixel brightness) and a 255 gray scale value would represent a very intense level of reflected light received by a pixel during an integration period (characterized as high pixel brightness).

Figure 4A:
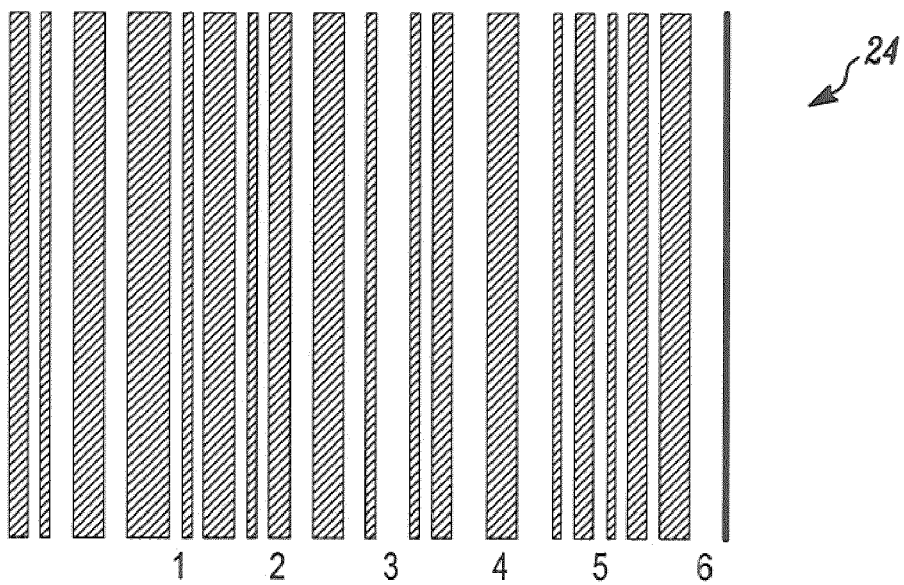
FIG. 4A is an example of a 1D bar code.
Figure 4B:
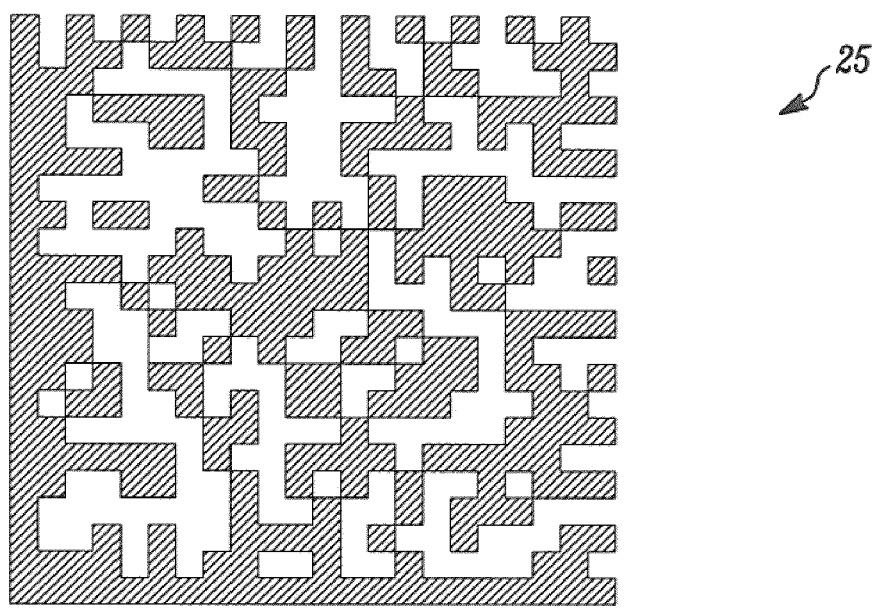
FIG. 4B is an example of a 2D bar code.

FIGS. 1 and 4A depicts a conventional 1D barcode 24. If the user moves the housing 13 in relation to such a bar code such that the motion is parallel or along the direction of the elongated bars that make up the 1D bar code, the barcode will appear to be clear in the output image captured by the controller, but the rest of the picture or image that is captured is blurred. If decoding of a barcode signals the controller to output an image from a serial communications output port (FIG. 3), for example, the blurred image is output. If the successful decoding of the barcode 24 causes the controller to merely store the image or a portion thereof, then that image will also be blurred.

One exemplary system avoids blurring of images captured in response to trigger actuation by use of a 2D barcode on the object. Such a 2D bar code 25 is depicted in FIGS. 3 and 4A. If there is relative movement between the reader and the target or object whose image is to be captured, there will be relative movement between the 2D barcode and the reader. The decode circuitry 140 will only be able to decode the 2D barcode if the form or object is stationary. This process of avoiding image blur, requires a presence of a 2D bar code on the object or target. In an alternate embodiment multiple 2D bar codes are spread through the form or object to reduce the error associated with the location of the output region of interest. Use of multiple spaced apart 2D bar codes around the document assure that the entire document can be imaged without blurring. If only one bar code is used, while the region in the vicinity of the single bar code will not be blurred, other document regions may be blurred and decoding a multiple number of 2D bar codes avoids this possibility.

If a particular form or object that needs to be imaged cannot be modified to include a 2D barcode, the controller 100 must detect and reject blurred output images in a different manner. The form contained in FIG. 3 (a driver's license) contains at least two bounding boxes 210, 212 which can be used to analyze if the image is blurred. In the following assume that the bar code of FIG. 3 is a 1D barcode 24, or alternately, in FIG. 1 a bounding box 220 is shown bounding the 1D barcode 24 which could represent either an object or a form on a document.

Based on a captured image, the controller 100 knows both the width and the height of the imaged bar code 24, typically measured in terms of pixels of the sensor 150. Input or stored and made accessible to the controller 100 is information regarding the width and height of the physical bar code 24. typically measured in terms of module units. A module unit of measure is based on the smallest bar or unit of encoded information in the bar code. To determine a presence of blur, the controller 100 correlates the size of the physical bar code 24 in module units (e.g., the bar code 24 is 100 modules in width by 20 modules in height) to the size of the imaged original bar code in memory (e.g., the imaged bar code is 300 image pixels in width by 60 pixels in height). Information regarding physical characteristics regarding the form and the relative location and size of the bar code 24 imprinted thereon is typically provided by the form designer and is accessible to the controller in a controller memory. Alternately this information could be encoded in the barcode 24 and therefore accessible to the controller 100 on a successful decoding of the bar code.

Figure 5:
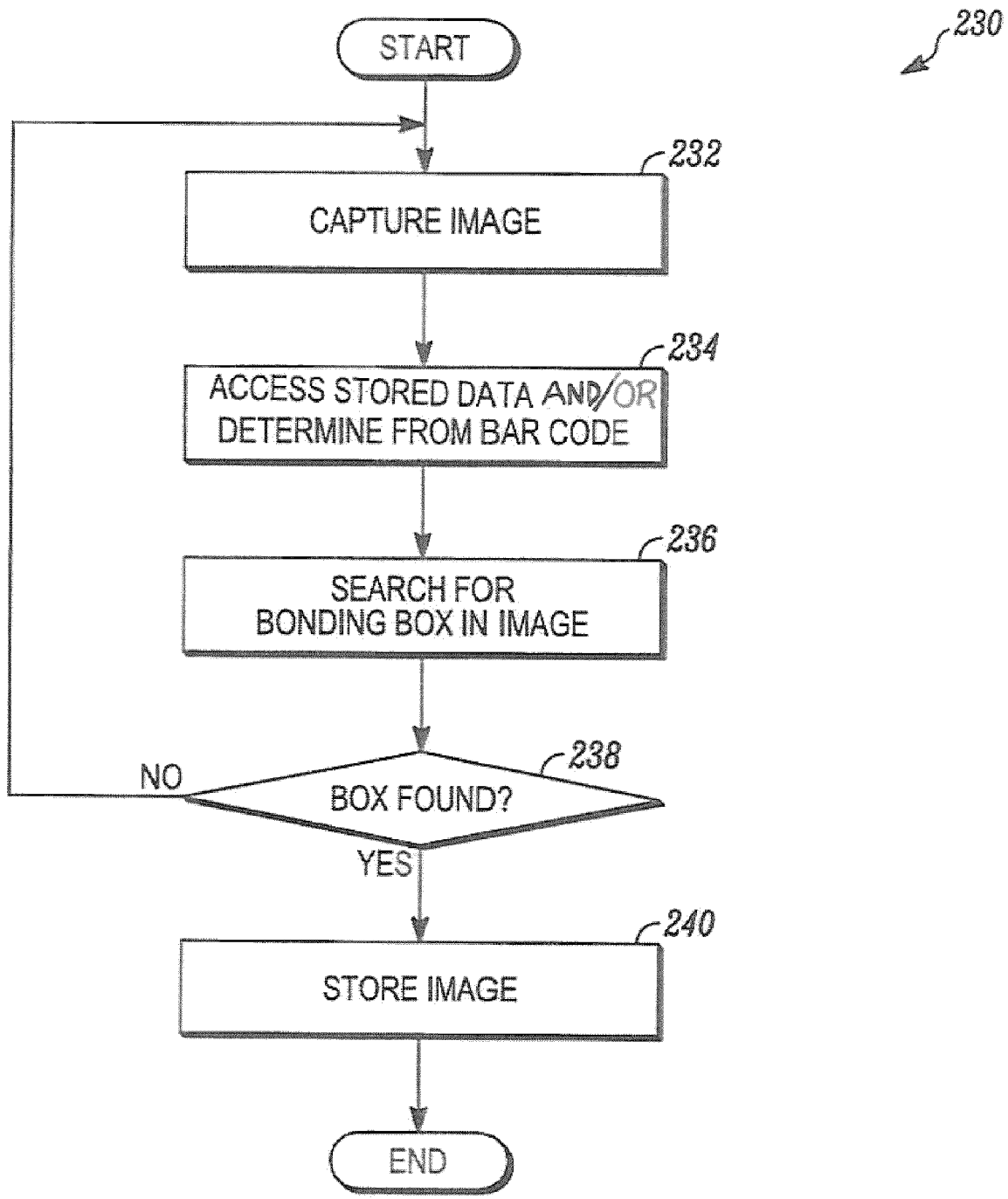
FIG. 5 is a flowchart of an exemplary method of the disclosed system.

FIG. 5 is a flowchart 230 of one alternate process the controller 100 uses to identify a blurred image. An image is captured 232 and the controller 100 decodes the bar code and then determines a geometric center or center point of the imaged and successfully decoded target bar code whose image is stored in memory 134. This is done by accessing 234 the information noted above regarding the size of the physical bar code 24 and data determined by the image processing system regarding the imaged bar code. Knowing the center point of the bar code, the controller determines a geometric center or center point of the imaged form 222 using information regarding the relationship between the center point of the physical bar code 24 and the location of the center point of the physical form 222. As noted, this information is typically provided by the form designer.

Once the center point of the imaged form is determined, the image processing system undertakes a search for the imaged border of the imaged form utilizing one or more box search techniques 236 such as edge detection and/or line tracking. One such process determines the location of the corners of the border or bounding box within the image and determines if the image at these pixel locations are sufficiently dark within the grey scale stored image. To make the process even more reliable the corners and pixel locations in close proximity to the corners that should correspond to locations within the lines of the bounding box are checked. The orientation of these lines are known, for example due to the fact that the orientation of the bar code 24 is known.

Assuming that horizontal and vertical sections or segments of the imaged border are found at step 238, all or part of the image is stored 240. If validation does not occur another image is captured 232.

Alternately, the controller 100 can judge the degree of uniformity of the bounding box around its perimeter or a portion of its perimeter. If an outer edge of a bounding box forms a line within limits, i.e. from the endpoints of the line no pixel of the boundary deviates from its calculated position based on its length from the ends, then the bounding box is bordered by a line and the image will not be blurred. Text characters can also be analyzed for clarity in a similar manner.

A common characteristic of all three processes (bar code, bounding box, and text) is the presence of generally orthogonal lines whose straightness can be judged by the imaging system 10. In the case of a 2D barcode, the code is made up of small m by n rectangular units having orthogonal sides. In determining the blurriness of the image, the decoding circuitry must be able to identify the boundaries in the bar code just as in identifying a bounding box it must be able to correctly discern the presence of the bounding box.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. An imaging-based reader for imaging target objects, the imaging based reader comprising: a housing supporting one or more transparent protective windows, the housing and one or more transparent protective windows defining an interior region; a least one imager located within said interior region, the imager comprising illumination and imaging optics, the illumination and imaging optics forming a field of view for imaging a target object within the field of view; said imager comprising a memory and a controller for acquiring a captured image within an imager field of view; confirming suitability based on blur of the captured image by decoding a 2D bar code in said captured image; and wherein the reader is a hand held reader having a user controlled actuator that signals the controller to capture an image and a feedback signal is conveyed to the user in the event the controller is unable to decode a 2D barcode and to store some or all of the captured image in a region of the 2D bar code in said memory only if the suitability of the captured image is confirmed.

2. The image-based reader of claim 1 wherein the controller captures one or more images of multiple 2D bar codes spaced from each other at different locations of a document or an object.

3. A method of improving the quality of the images obtained by an imaging bar code reader comprising: providing an imaging-based bar code reader; providing a document or object for imaging with indicia having generally orthogonally extending edges; acquiring an image of the document or object within a field of view of the imaging-based bar code reader; confirming suitability based on blur of the image of the document or object by evaluating the indicia contained within said image; and storing some or all of the image in a memory only if the suitability of the image is confirmed, wherein said evaluating the indicia contained within said image comprises at least one of evaluating 2D bar code and a bounding box that bounds at least a portion of the image to be stored once its suitability is determined.

4. The method of claim 3 wherein multiple 2D bar codes are spaced at different locations of the document or object and the step of confirming involves decoding all such multiple 2D bar codes.

5. The method of claim 3 wherein the evaluating is performed by determining a straightness of two sides of the bounding box.

6. The method of claim 3 wherein the evaluating is performed by analyzing multiple pixel locations that should co-incide with the bounding box or portion of a bounding box.

7. A method of improving the quality of the scanned images in an imaging bar code reader comprising: positioning an imager inside a housing behind at least one protective window, the housing and protective window defining an interior region; acquiring an image within a bar code reader field of view; confirming suitability based on blur of the captured image by decoding a 2D bar code in said captured image; and storing some or all of the captured image in proximity to the 2D bar code in a memory only if the suitability of the captured image is confirmed.

8. The method of claim 7 wherein in the event a first image capture does not result in a 2D bar code decode, one or more additional images are acquired and further comprising attempting to decode 2D bar codes in said additional images.

9. The method of claim 7 additionally comprising providing a document or object having multiple 2D bar codes spaced apart from each other on the document or object and confirming the suitability by decoding each of the multiple 2D bar codes.

* * * * *